June 2, 1964

C. D. ERICKSON 3,135,125

VARIABLE RATIO TRANSMISSION APPARATUS

Filed March 16, 1962

INVENTOR.
CHARLES D. ERICKSON
BY
Andrus & Starke
ATTORNEYS

United States Patent Office

3,135,125
Patented June 2, 1964

1

3,135,125
VARIABLE RATIO TRANSMISSION APPARATUS
Charles D. Erickson, Erie, Pa., assignor to A. O. Smith Corporation, Milwaukee, Wis., a corporation of New York
Filed Mar. 16, 1962, Ser. No. 180,116
9 Claims. (Cl. 74—194)

This invention relates to a variable ratio transmission apparatus and particularly to the type commonly known as a ball integrating variety.

In the ball integrating type transmission unit, the motion of a rotating disc is transmitted to an output shaft through a plurality or stack of transmission balls or roller members slidably mounted on the shaft. The recently issued U.S. Patent 3,024,665, which issued March 13, 1962, to William E. Steen, discloses a particularly high efficient transmission apparatus of this type including a spring-loaded bearing for supporting the one end of the output shaft. The specific embodiments of that invention disclose transmission balls interposed between the rotating disc and the output shaft with the proportionate rotational speed of the output shaft determined by the radial positioning of the transmission balls on the disc. U.S. Patent 2,218,651 discloses a steel roller axially mounted on the output shaft and in rolling engagement with the disc in place of the equivalent transmission balls of the above patent.

The present invention is particularly directed to a variable ratio transmission employing a roller member slidably mounted on the output shaft in a manner to allow accurate positioning of the roller member with a high degree of sensitivity. In accordance with the present invention, a special roller to shaft suspension system is provided to minimize the frictional forces between the axial movement of the roller on the shaft. The roller member is disposed on the shaft with a small clearance therebetween and precision ball bearings are provided at opposite ends of the roller member to support the roller on the shaft. The roller member may then be accurately positioned with a relatively low force. Applicant has also found that for maximum sensitivity and response, the friction disc and drive shaft connected thereto should be formed as a separate member and interconnected by a vertical splined connection. This construction permits slight misalignment between the plane of the disc and the axis of the shaft without undue binding in the shaft journal.

The present invention thus provides a variable ratio transmission apparatus having an axially positionable roller responsive to small signal movements.

The drawing furnished herewith illustrates the best mode presently contemplated for carrying out the invention.

Figure 1:
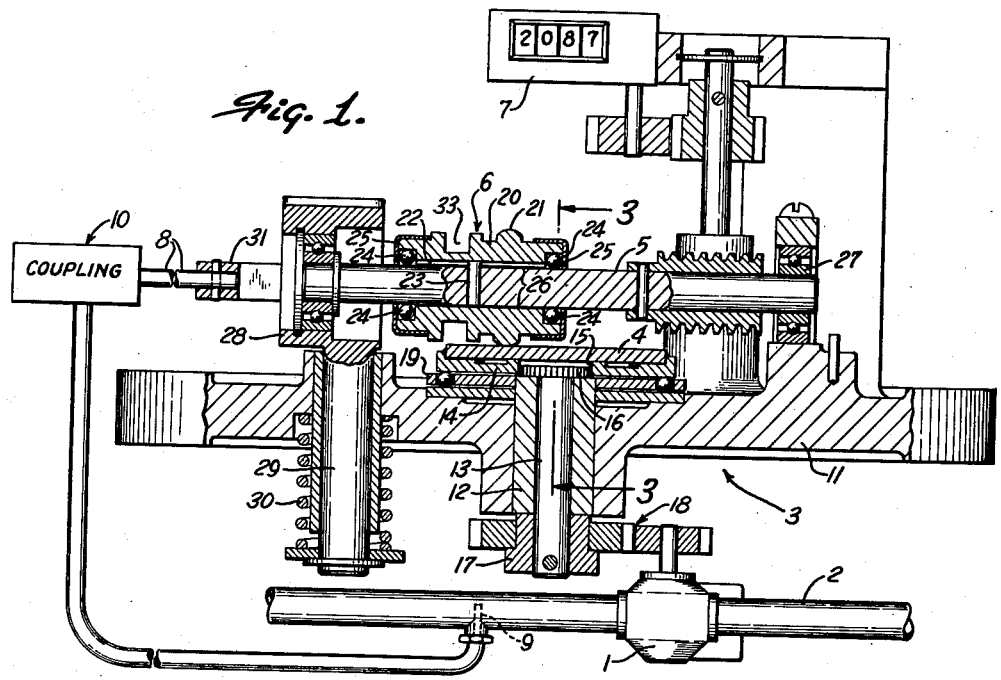
FIG. 1 is a sectional view of a variable ratio transmission apparatus incorporating the structure of the present invention.
Figure 2:
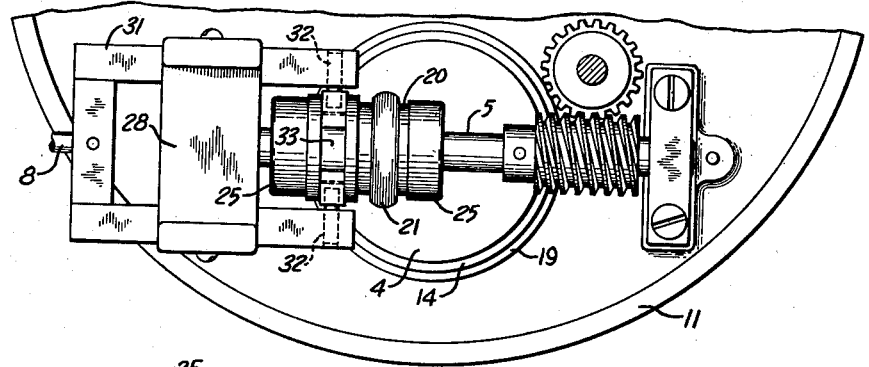
FIG. 2 is a plan view of the apparatus shown in FIG. 1.
Figure 3:
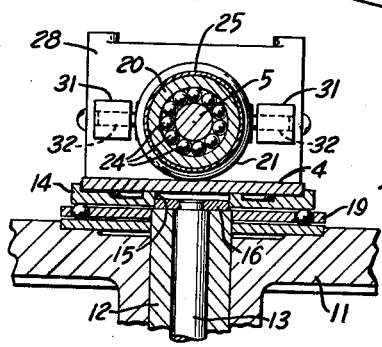
FIG. 3 is a vertical section taken on line 3—3 of FIG. 1.

Referring to the drawing and particularly to FIG. 1, a meter 1 is mounted in a liquid delivery line 2 and generates or establishes a rotational output in accordance with volumetric flow through line 2. The output of meter 1 is connected to a variable ratio transmission apparatus 3 to drive a friction drive disc 4 forming a component thereof. The friction disc 4 is coupled to drive an output shaft 5 by a ratio control roller unit 6 and actuate a suitable counter 7 or other recording means to re-

2 cord the flow. The transmission ratio from disc 4 to output shaft 5 is determined by the radial position of the roller unit 6. A control lever 8 is connected to the ratio control roller unit 6 for selective positioning of the roller radially of the friction disc 4.

The control lever 8 may be connected to any suitable modifying or overriding control. For example, in the transmission of oil and the like, the volume of the liquid changes with temperature and a suitable temperature sensitive unit 9 is inserted in line 2 and connected to control lever 8 to regulate the ratio of the drive in accordance with changes in the temperature. The recording of the fluid of the liquid flow is thus always reduced to a common temperature. The connection between unit 9 and lever 8 may be of any suitable construction; for example, as shown in U.S. Patent 3,024,665 and is shown by a block 10 labeled "coupling" in the drawing.

The illustrated ratio transmission apparatus 3 of the present invention includes a supporting frame 11 having a journal 12 for rotatably supporting a friction disc shaft 13 for disc 4. The friction disc 4 is generally a disc-like member which is cemented or otherwise secured in an annular recess within the top surface of a support plate 14. A central coupling opening is provided in the support plate 14 with a plurality of vertical splines 15 circumferentially distributed about the opening. A splined disc 16 mates with spline 15 and is press-fitted onto the upper end of the shaft 13 to transmit the rotary motion of the shaft to the support plate 14 and the attached friction disc 4.

The shaft 13 is secured in an axial direction within journal 12 by the disc 16 which bears on the upper end of journal 12 and a gear hub 17 which is pinned to the opposite end of the shaft 13 and bears on the lower end of journal 12. Suitable coupling gears 18 interconnect the gear hub 17 to the meter 1.

A ball bearing unit 19 is mounted on the frame 11 immediately beneath the support plate 14 and rotatably supports the outer peripheral portion of the friction disc 4 and substantially holds the disc in a horizontal plane.

The output shaft 5 is rotatably mounted on the supporting frame 11 extending diametrically of the disc 4 and spaced from the face thereof. The ratio control roller unit 6 is slidably mounted on the shaft 5 and biased into frictional engagement with the friction disc 4.

The roller unit 6 includes a hollow hub 20 having a hardened steel roller 21 formed on the periphery thereof. The hub 20 is formed with an internal keyway 22 extending axially thereof. A small key 23 is disposed in a diametrical slot in the shaft 5 and projects outwardly into keyway 22 to rotatably interlock the hub 20 to the shaft 5. The opposite ends of the hub 20 are similarly supported by precision ball bearings 24 which are held within a recess on the inner edge of the hub by suitable retaining caps 25. The latter are shown as small metallic caps 25 which snap over the ends of the hub 20. The precision ball bearings 24 support the hub with a slight clearance 26 between the bore of hub 20 and the shaft 5 to essentially eliminate frictional forces therebetween.

The output shaft 5 is supported at one end in a relatively fixed roller bearing 27 and at the opposite end in a movable bearing unit 28 which is mounted for limited movement on a line parallel to the axis of the friction disc shaft 13. Bearing unit 28 includes a movable shaft member 29 encircled by a spring 30 which continuously urges the movable bearing in a direction to force the hub 20 and more particularly the steel roller 21 into firm frictional engagement with the surface of friction disc 4. A highly efficient transmission of motion from the friction disc 4 to the steel roller 21 is thereby established as more fully set forth in U.S. Patent 3,024,665. It appears sufficient here to note that the spring 30 serves to increase the friction between the roller 21 and disc 4 as the roller travels to the center of the disc. Maximum friction is thus established at the area or position of lower speed as required. At higher speeds, less friction is necessary and provided with a consequent reduction in wear.

The spring loading of the roller 21 by the bearing spring 30 does not however prevent accurate positioning thereof on the shaft 5 because of the support by the precision ball bearings 24 which essentially eliminate frictional forces therebetween. The present invention thus permits sensitive positioning of roller 21 while permitting maximum efficiency of transmission from disc to shaft 5.

The control lever 8 is attached to position the hub 20 and thereby the steel roller 21 in accordance with temperature changes and thereby modify the transmission ratio to maintain the recording of volumetric flow at a base temperature.

In the illustrated embodiment of the invention, the control lever 8 is fixed to the base portion of a bifurcated or U-shaped coupler 31. The side arms of coupler 31 extend axially to either side of one end of the hub 20 and support coupling pins 32 mating with an annular recsss 33 on the hub 20. Axial movement of the lever 8 is thus transmitted to the hub 20 which remains free to rotate independently of the control lever 8 and the coupler 31.

The operation of the illustrated embodiment of the invention is described as follows.

The meter 1 is coupled to the flow line 2 to record the actual volume of flow through the line and to drive the friction disc accordingly. The control lever 8 is coupled to a temperature sensitive unit 9 and positions the control lever 8 in accordance with the temperature of the liquid in the line 2. If the temperature varies in either direction, the control lever 8 will be correspondingly moved to position the steel roller 21 in a corresponding radial direction on the friction disc 4 inwardly or outwardly and to thereby vary the ratio transmission from friction disc 4 to the steel roller 21 and the output shaft 5.

The mounting of the roller hub 20 by the ball bearings 24 allows very accurate and responsive positioning of the roller 21 in response to very small changes in temperature. By employing a highly sensitive response unit 9, the output of the meter 1 as recorded by counter 7 can be maintained very accurately related to a selected base temperature.

As the steel roller 21 moves radially outwardly to the outer portion of the friction disc 4, an increased twisting or torque force is applied on the disc 4 with respect to the shaft 13. Although the ball bearing unit 19 substantially supports the disc 4, the necessary play and tolerances in the assembly permit slight movement of the plane of disc 4. The splined connection between the support plate 14 for disc 4 and the splined disc 16 allow slight misalignment of the plane of the disc 4 with respect to the axis of the shaft 13 without noticeable binding of the shaft 13 within the journal 12. This substantially eliminates wear within the journal 12 and maintains accurate functioning of the transmission apparatus 3.

The present invention provides a rugged reliable variable ratio transmission unit which may be made sensitive to relatively small signal changes.

Various modes of carrying out the invention are contemplated as being within the scope of the following claims particularly pointing out and distinctly claiming the subject matter which is regarded as the invention.

I claim:

1. In a variable ratio transmission unit having a friction disc and a roller slidably secured to an output shaft in frictional engagement with the friction disc, the improvement including,
   (a) an input shaft,
   (b) a separate coupling interconnecting the input shaft to the friction disc and permitting limited pivotal movement of the friction disc with respect to the axis of the shaft, and
   (c) essentially frictionless bearing means supporting the roller on said output shaft, said bearing means providing the only support means for said roller on said shaft.

2. The variable ratio transmission of claim 1 having,
   (a) resilient support means for one end of the output shaft and stressed to urge the roller into frictional engagement with the friction disc.

3. The variable ratio transmission of claim 1 wherein said separate coupling includes,
   (a) a circular member forming a part of the input shaft and having a series of axial splines, and
   (b) a member forming a part of the friction disc and having a corresponding internally splined opening mating with said circular member.

4. A variable ratio transmission apparatus comprising,
   (a) a supporting frame,
   (b) a shaft journaled in the frame and having a splined disc secured to one end thereof,
   (c) a friction disc including a support plate having a central splined opening mating with said splined disc and a disc portion fixed to the support plate,
   (d) thrust bearing means disposed between the friction disc and the frame to substantially support the outer portion of the friction disc,
   (e) an output shaft rotatably mounted overlying the friction disc,
   (f) a hub slidably mounted on the output shaft with clearance therebetween and rotatably fixed to the shaft,
   (g) essentially frictionless ball bearing means secured to the ends of the hub and resting on the output shaft to slidably support the hub on the shaft, and
   (h) a roller integrally formed on the periphery of the hub.

5. A variable ratio transmission apparatus comprising,
   (a) a supporting frame,
   (b) an input shaft journaled in the frame and having a lower hub member and an upper splined disc secured to opposite ends thereof,
   (c) a friction disc including a support plate having a central splined opening mating with said splined disc and a disc portion fixed to the support plate,
   (d) a ball bearing unit disposed between the friction disc and the frame to substantially support the outer portion of the friction disc,
   (e) an output shaft rotatably mounted on opposite sides of the friction disc by a fixed roller bearing unit and a movable roller bearing unit,
   (f) a hub slidably mounted on the output shaft with clearance therebetween,
   (g) precision ball bearings disposed within recesses in the ends of the hub and resting on the output shaft to provide frictionless support means for said hub,
   (h) retaining caps secured to the ends of the hub,
   (i) a roller formed on the periphery of the hub, and
   (j) means urging the movable bearing unit to hold the roller in engagement with the disc.

6. In a variable ratio transmission having a friction disc and a transmission roller slidably secured to an output shaft and frictionally engaging the friction disc, the improvement including,
   (a) first ball bearing means supporting one end of the roller on said output shaft, and
   (b) second ball bearing means supporting the opposite end of the roller on said output shaft, said first and second ball bearing means providing the only support means for said roller on said shaft.

7. In a variable ratio transmission apparatus having a friction disc and an output shaft rotatably mounted overlying the disc,
- (a) a hub slidably mounted on the shaft with clearance therebetween,
- (b) precision ball bearings disposed within recesses in the ends of the hub and resting on the shaft,
- (c) retaining caps secured to the ends of the hub to retain the ball bearings within said recesses, and
- (d) a roller formed on the periphery of the hub and frictionally engaging the friction disc.

8. In a variable ratio transmission according to claim 7, having a friction disc and an output shaft coupled thereto by a rotating coupling means, the improvement including,
- (a) a friction disc shaft for rotatably driving the disc, and
- (b) a splined coupling interconnecting the shaft and the disc to allow limited movement of the plane of the disc with respect to the axis of the shaft.

9. In a variable ratio transmission apparatus for transmitting a rotary motion to an output, comprising,
- (a) a supporting frame,
- (b) a shaft journaled in the frame,
- (c) a splined disc secured to one end of the shaft,
- (d) a friction disc including a support plate having a central splined opening mating with said splined disc and a disc portion fixed to the support plate,
- (e) a ball bearing unit disposed between the friction disc and the frame to substantially support the outer portion of the friction disc, and
- (f) rotatable means frictionally engaging the friction disc for transmitting the rotary motion thereof.

References Cited in the file of this patent
UNITED STATES PATENTS

| | | |
|---|---|---|
| 957,795 | Parkinson | May 10, 1910 |
| 2,218,651 | Lenney | Oct. 22, 1940 |
| 2,510,109 | Hermanny | June 6, 1950 |
| 3,024,665 | Steen | Mar. 13, 1962 |